US010917801B2

(12) United States Patent
Yan et al.

(10) Patent No.: US 10,917,801 B2
(45) Date of Patent: Feb. 9, 2021

(54) PREDICTIVE IMPACT ANALYSIS FOR DESIGNING A RESILIENT CELLULAR BACKHAUL NETWORK

(71) Applicants: AT&T INTELLECTUAL PROPERTY I, L.P., Atlanta, GA (US); Georgia Tech Research Corporation, Atlanta, GA (US)

(72) Inventors: He Yan, Berkeley Heights, NJ (US); Zihui Ge, Madison, NJ (US); Dongmei Wang, Basking Ridge, NJ (US); Sen Yang, Sunnyvale, CA (US); Jun Xu, Sandy Springs, GA (US)

(73) Assignees: AT&T INTELLECTUAL PROPERTY I, L.P., Atlanta, GA (US); GEORGIA TECH RESEARCH CORPORATION, Atlanta, GA (US)

( * ) Notice: Subject to any disclaimer, the term of this patent is extended or adjusted under 35 U.S.C. 154(b) by 330 days.

(21) Appl. No.: 15/965,736

(22) Filed: Apr. 27, 2018

(65) Prior Publication Data
US 2019/0335345 A1    Oct. 31, 2019

(51) Int. Cl.
*H04W 24/06* (2009.01)
*H04W 24/02* (2009.01)
(Continued)

(52) U.S. Cl.
CPC ........... *H04W 24/06* (2013.01); *H04W 16/18* (2013.01); *H04W 24/02* (2013.01); *H04W 24/10* (2013.01);
(Continued)

(58) Field of Classification Search
CPC ..... H04W 24/06; H04W 16/18; H04W 24/02; H04W 24/10; H04W 40/246; H04W 40/34; H04W 88/10; H04W 24/08
See application file for complete search history.

(56) References Cited

U.S. PATENT DOCUMENTS 5,146,452 A    9/1992 Pekarske
5,463,615 A    10/1995 Steinhorn
(Continued)

FOREIGN PATENT DOCUMENTS

WO    2016123268 A1    8/2016

OTHER PUBLICATIONS

O'Reilly, et al. "Critical infrastructure analysis of telecom for natural disasters." Telecommunications Network Strategy and Planning Symposium, 2006. Networks 2006.12th International.IEEE, 2006.
(Continued)

*Primary Examiner* — Kibrom T Hailu
(74) *Attorney, Agent, or Firm* — Amin, Turocy & Watson, LLP

(57) ABSTRACT

Various embodiments disclosed herein provide for a tower outage impact predictor that can determine the service impact on an end user during a cellular tower outage. Radio signal profiling divides an area into grids, and then constructs a radio signal profile for each grid based on user equipment (UE) measurement data for each grid. The number of UEs in each grid is then determined, and then the number of UEs that lose service for a simulated cellular tower outage is determined. Based on the impact analysis, a more resilient backhaul network can be implemented by determining backhaul rehoming changes that optimally home cellular towers to various backhaul network devices.

20 Claims, 15 Drawing Sheets

(51) Int. Cl.
*H04W 24/10* (2009.01)
*H04W 40/34* (2009.01)
*H04W 88/10* (2009.01)
*H04W 40/24* (2009.01)
*H04W 16/18* (2009.01)

(52) U.S. Cl.
CPC ......... *H04W 40/246* (2013.01); *H04W 40/34* (2013.01); *H04W 88/10* (2013.01)

(56) References Cited

U.S. PATENT DOCUMENTS

| | | | |
|---|---|---|---|
| 5,513,345 | A | 4/1996 | Sato et al. |
| 5,872,911 | A | 2/1999 | Berg |
| 6,038,212 | A | 3/2000 | Galand et al. |
| 6,163,525 | A | 12/2000 | Bentall et al. |
| 6,169,881 | B1 | 1/2001 | Astrom et al. |
| 6,327,669 | B1 | 12/2001 | Croslin |
| 7,080,144 | B2 | 7/2006 | Boehmke |
| 7,583,962 | B2 | 9/2009 | Nelson et al. |
| 7,693,079 | B2 | 4/2010 | Cerami et al. |
| 7,761,730 | B2 | 7/2010 | Bailey et al. |
| 8,000,913 | B2 | 8/2011 | Kreiss et al. |
| 8,326,217 | B2 | 12/2012 | Wahlberg et al. |
| 8,666,390 | B2 | 3/2014 | Meredith et al. |
| 8,923,134 | B2 | 12/2014 | Meredith et al. |
| 9,271,296 | B2 * | 2/2016 | Olfat .................. H04W 72/048 |
| 9,392,574 | B1 | 7/2016 | Glenn et al. |
| 9,426,665 | B2 | 8/2016 | Ge et al. |
| 2003/0054759 | A1 * | 3/2003 | Da .......................... G01S 19/42 455/7 |
| 2006/0203743 | A1 * | 9/2006 | Quinn ................ H04L 41/0886 370/254 |
| 2010/0214943 | A1 * | 8/2010 | Immendorf .......... H04W 36/30 370/252 |
| 2010/0216453 | A1 | 8/2010 | Kallin et al. |
| 2012/0150521 | A1 * | 6/2012 | Balkwill ............... H04W 16/22 703/13 |
| 2013/0051239 | A1 * | 2/2013 | Meredith .............. H04W 16/18 370/241 |
| 2013/0173514 | A1 | 7/2013 | Cruickshank et al. |
| 2013/0201842 | A1 * | 8/2013 | Chou .................... H04W 28/08 370/252 |
| 2015/0263522 | A1 | 9/2015 | Bernal et al. |
| 2015/0264644 | A1 * | 9/2015 | Kamijoh ............... H04W 64/00 455/424 |
| 2016/0198356 | A1 * | 7/2016 | Miyai ................... H04W 16/18 370/252 |
| 2016/0276831 | A1 | 9/2016 | Karlak et al. |
| 2016/0286529 | A1 * | 9/2016 | Ma ....................... H04J 13/0003 |
| 2016/0343093 | A1 | 11/2016 | Riland et al. |
| 2017/0105174 | A1 * | 4/2017 | Kamijoh ............... H04W 64/00 |
| 2017/0230850 | A1 * | 8/2017 | Blake .................. H04L 43/0817 |
| 2017/0280504 | A1 * | 9/2017 | De Pasquale ......... H04W 36/24 |

OTHER PUBLICATIONS

Conrad, et al. "An Overview of Energy and Telecommunications Interdependencies Modeling at NISAC." http://citeseerx.ist.psu.edu/viewdoc/download?doi=10.1.1.107.8749&rep=rep1&type=pdf; Last accessed Apr. 26, 2018.

Marathe, et al. "Prescriptive analytics using synthetic information." Emerging Trends in Predictive Analytics: Risk Management and Decision Making (2014): 1-19.

Kezunovic, et al. "Predictive Asset Management Under Weather Impacts Using Big Data, Spatiotemporal Data Analytics and Risk Based Decision-Making." http://smartgridcen ter.tamu.edu/resume/pdf/cnf/IREP_0520_2017_Final.pdf; Last accessed Apr. 26, 2018.

Vela, et al. "Estimating the effect of network element events in a wireless network." EURASIP Journal on Wireless Communications and Networking Jan. 2018 (2018): 82.

\* cited by examiner

900

PREDICTIVE IMPACT ANALYSIS FOR DESIGNING A RESILIENT CELLULAR BACKHAUL NETWORK

TECHNICAL FIELD

The present application relates generally to the field of impact analysis for mobile network outages and designing resilient backhaul networks in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
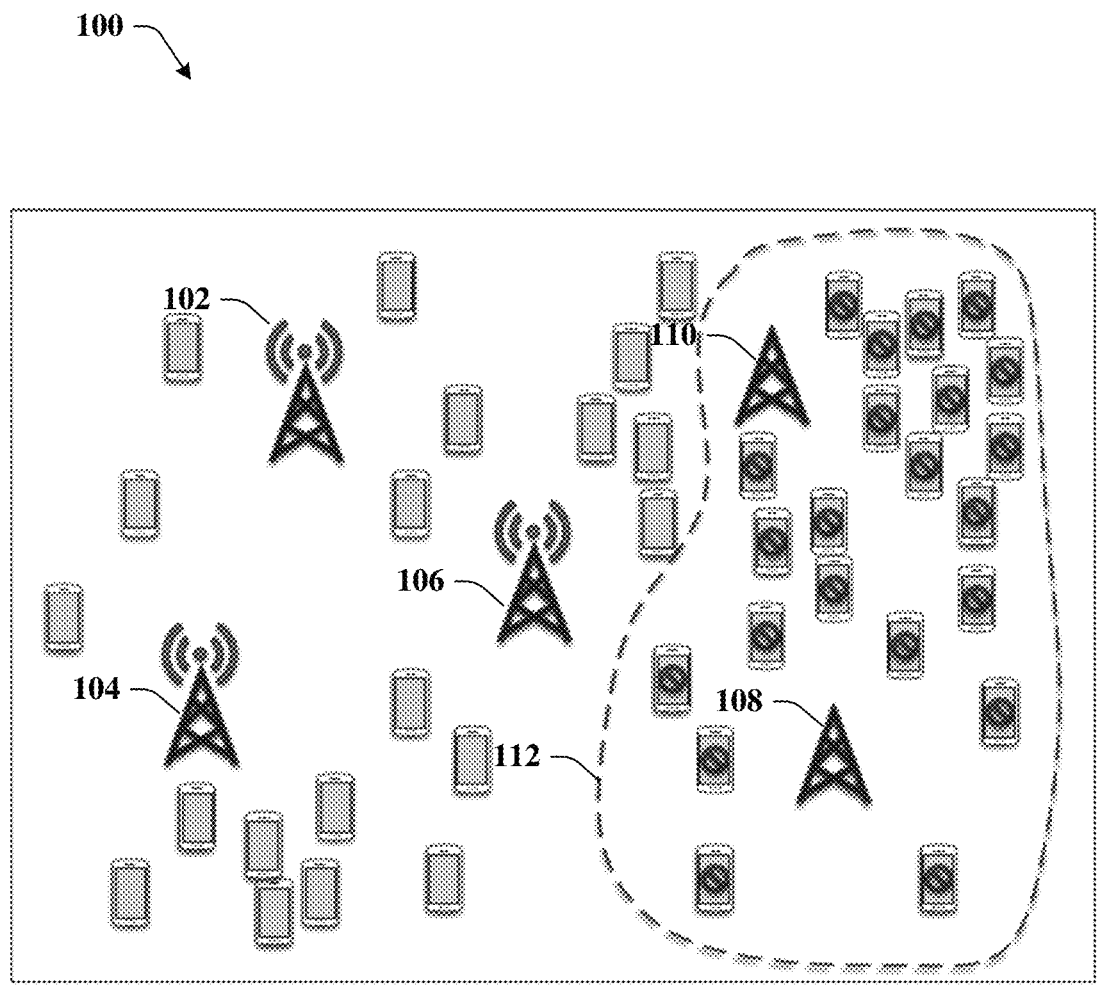
FIG. 1 illustrates an example wireless communication system where there is a clustered outage with significant customer impact in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a tower outage impact predictor that can determine the service impact on an end user during a cellular tower outage. Radio signal profiling divides an area into grids, and then constructs a radio signal profile for each grid based on user equipment (UE) measurement data for each grid. The number of UEs in each grid is then determined, and then the number of UEs that lose service for a simulated cellular tower outage is determined. Based on the impact analysis, a more resilient backhaul network can be implemented by determining backhaul rehoming changes that optimally home cellular towers to various backhaul network devices.

In an embodiment, a system can comprise a processor and a memory that stores executable instructions that, when executed by the processor facilitate performance of operations. The operations can comprise determining a group of radio signal profiles for respective grid sections of a group of grid sections comprising a cellular service area for a cellular network, wherein a radio signal profile of the group of radio signal profiles comprises information relating to a base station device that provides coverage of the cellular network in a grid section of the respective grid sections. The operations can also comprise determining a first number of mobile devices that are active in the respective grid sections of the group of grid sections. The operations can also comprise based on the first number of mobile devices and the group of radio signal profiles for the respective grid sections, predicting a second number of mobile devices that lose the coverage of the cellular network as a consequence of a simulated base station device outage.

In another embodiment, method comprises partitioning, by a network device comprising a processor, a mobile network service area into a group of area sections, wherein the group of area sections have mobile network coverage facilitated by a group of base station devices. The method can also comprise based on a function of a radio signal profile of an area section of the group of area sections and a second number of mobile devices that are active in the area section, determining, by the network device, a first number of mobile devices that will lose the mobile network coverage as a result of a simulated base station device outage associated with a first base station device of the group of base station devices, wherein the radio signal profile is based on identifiers of base station devices of the group of base station devices that facilitate the mobile network coverage for the area section. The method can also comprise determining, by the network device, a rerouting path for a network switch device associated with a second base station device based on the first number of mobile devices.

In another embodiment machine-readable storage medium, comprising executable instructions that, when executed by a processor of a device, facilitate performance of operations. The operations can comprise determining a radio signal profile for a section of a mobile network coverage area, wherein the radio signal profile comprises information relating to a group of base station devices that provides the mobile network coverage in the section. The operations can also comprise determining a first number of mobile devices that are active in the section. The operations can also comprise predicting a second number of mobile devices that lose the mobile network coverage in a simulated base station device outage based on the first number of mobile devices and the radio signal profile. The operations can also comprise based on the second number of mobile devices that lose the mobile network coverage in the simulated base station device outage, determining a rerouting path for a network switch device associated with a base station device of the group of base station devices.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 where there is a clustered outage in accordance with various aspects and embodiments of the subject disclosure.

In the embodiment shown in FIG. 1, there are several base station devices (e.g., cellular towers, eNodeB, gNodeB, etc.) 102, 104, 106, 108, and 110 that service a plurality of UEs. If base station device 110 and 108 were to suffer an outage at the same time (e.g., a backhaul line was cut or damaged, or a backhaul network device was disabled) the group of mobile devices in service area 112 would experience an outage, since the base station devices 108 and 110 were clustered together. If, however, as shown in the wireless communication system 200 shown in FIG. 2, base station device 212 and 214 have an outage at the same, the devices in smaller service areas 202 and 208 would suffer an outage, as most of the remaining devices could receive service from base station devices 204, 206, and 210. The Tower Outage Impact Predictor (TOIP) disclosed herein can model the end user impact (number of devices that remain in service or suffer an outage) for a given set of base station outages by modeling simulated outages. The impact analysis can then be used to rehome or facilitate rehoming cellular towers to reduce the impact of an outage.

The design and optimization of a layer-1/2 transport network can have input that are broadly divided to three different aspects: risk, service impact, and cost. Risk models the likelihood of the occurrence and co-occurrence of various types of outages (e.g., fiber cut, component failure) in the layout and routing design; service impact quantifies the consequence (e.g., loss-of-service) of different failure scenarios; and cost reflects the expenditures associated with the implementation and maintenance of the design. For cellular service providers, the service impact analysis can be extremely challenging when designing the backhaul transport network connecting to and from the cellular towers.

Figure 2:
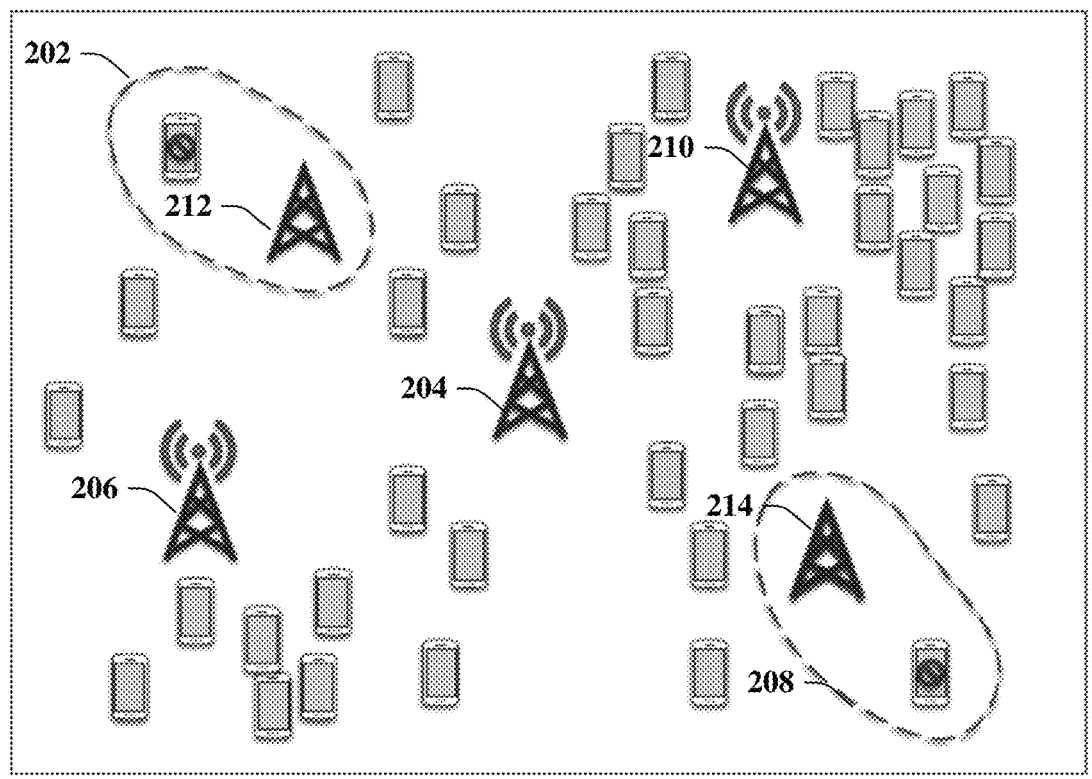
FIG. 2 illustrates an example wireless communication system where there is a scattered outage in accordance with various aspects and embodiments of the subject disclosure. In contrast to FIG. 1, with the same number of failed towers, the customer impact of the scattered outage is much smaller. That means the same number of failed towers could mean drastically different customer impact depending on the details of outages.

Typically, a UE can be within the radio reach of multiple cellular towers. Hence, not all cellular tower outages actually have a significant impact on the service they provide—nearby towers may well be able to service mobile users who would normally have been serviced from the failed tower(s), depending on signal propagation characteristics and network load. For example, close-by tower outages usually lead to much larger "out-of-service" area than the scattered ones. Furthermore, the actual service impact of an outage also depends on the spatial distribution of UEs and their demand: it may vary significantly when a similar outage happens in different areas (metropolis versus suburb) and different time periods (morning versus late midnight). FIGS. 1 and 2 illustrate two examples of tower outages where the service impact (measured by the number of UEs that loss cellular service) varies significantly while the number of out-of-service cellular towers is the same. Understanding and quantifying the service impact of a group of cellular towers becoming inaccessible calls for a comprehensive understanding on the radio signal profile in the area of the impacted towers, the spatial distribution of UEs therein, and their expected workload (e.g., calls, data throughput).

Figure 3:
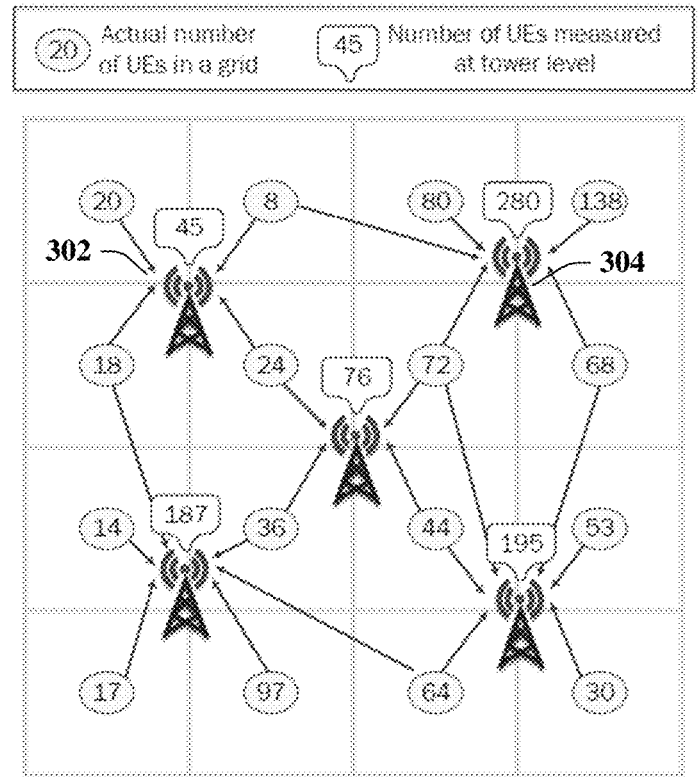
FIG. 3 illustrates an example wireless communication system that determines a number of mobile devices linked with each base station device in accordance with various aspects and embodiments of the subject disclosure.
Figure 4:
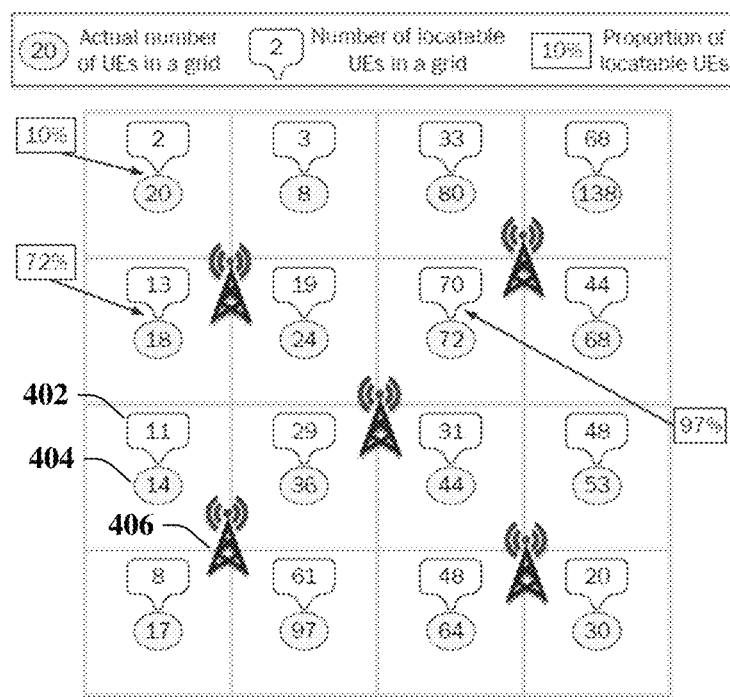
FIG. 4 illustrates an example wireless communication system that determines a number of mobile devices in a group of grids in accordance with various aspects and embodiments of the subject disclosure.

Turning now to FIGS. 3 and 4, illustrated are example wireless communication systems 300 and 400 that determines a number of mobile devices linked with each base station device, and in which grid the mobile devices are in accordance with various aspects and embodiments of the subject disclosure.

The tower level data (e.g., from example cellular tower 302) can provide an accurate number of UEs served by individual towers as shown in FIG. 2(a). However, it may not contain the spatial distribution of UEs and the radio profile of UEs (e.g., the tower providing best radio signal and the other alternative towers in the same area), which facilitates predicting the service impact on end-user's equipments given any hypothetic cellular-tower outage scenario. On the other hand, as shown in FIG. 4, it is possible to divide the area into small grids of the same size and aggregate the UE-level measurements within each grid. Such grid level data can provide information regarding the spatial distribution and the radio profile of UEs. As for example in FIG. 4, for a given base station device 406, in a grid nearby, there maybe 14 mobile devices (e.g., 404), but 11 of them might be locatable in the grid (e.g., 402). The system disclosed herein can improve the locatability of the mobile devices in each grid, and that can be used to determine the end user impact of a tower outage.

In order to overcome these challenges, the disclosure provides a novel 3-stage methodology to predict the service impact on UEs given any hypothetic cellular-tower outage scenario. (1) Radio signal profiling: Dividing the geographic service area into grids and construct the radio signal profiles for each grid (e.g., a list of cellular towers covering the grid) based on the UE-level measurements associated with each grid. (2) Calibrating grid-level number of UEs: Formulating and constructing a ridge regression model to interpolate the grids with the number of UEs information such that the tower-level number of UEs is well matched over time; (3) Survival analysis: For any given tower outage scenario, determining the cellular service survivorship of the grids based on the radio signal profiles and estimating the total number of survivable UEs using the computed regression model parameters The resulting estimator is unbiased and efficient, and has a nice decomposition property: the original problem, which is of size $|S| \times |G|$, can be extremely large and hard to be solved in one shot, where $|S| \approx 10^5$ is the total number of towers or antennas and $|G| \approx 10^9$ is the total number of grids across the country. Our method can decompose it into $|S|$ sub-problems, each of which is of size $O(1)$ and can be solved separately. Such decomposition significantly simplified the problem and allows the computation to be further expedited via hardware parallelism.

The backhaul transport network for cellular service providers provides connectivity between the cellular towers, where mobile base stations (2G), NodeBs (3G), eNodeBs (4G), or gNodeBs (5G) are located, and the Mobile Telephone Switching Offices (MTSOs), where the various voice and data application are hosted (or aggregated and routed further upstream for processing). The mobility backhauls can be provided via Ethernet Virtual Circuits (EVS) over metro Ethernet transport.

Due to the large footprint of the access requirement, most carriers design the metro Ethernet networks in a hierarchical (or "hub-and-spoke") arrangement. For example, in an exemplary embodiment, a metro Ethernet transport network is called IPAG (IP Aggregation Platform) consisting of Ethernet switches and routers. Typically, a carrier owned termination switch, called Network Terminating Equipment (NTE), is placed at the cellular tower location, which connects to Ethernet switches (called Emux) in Wire Centers (WCs) through direct feeder or loop. Several Emux connect to a small router, which is usually located in another larger WC. Several small routers then home to a similar, but larger router. For reliability purposes, larger routers form a mesh topology with single failure restoration capability while smaller routers are dual-homed to a pair of larger routers via different uplinks. In real networks, variations to the above layout exist. Sometimes, a cellular site NTE may connect directly to a smaller router (bypassing an Emux) when less costly to do so. Or sometimes, a chain of point-to-point Microwave links are used in inaccessible areas. While the feeder fiber network usually forms a tree structure rooted at the WC, the inter-WC paths typically route over segments of direct fiber or Dense Wavelength Division Multiplex (DWDM) transmission systems. Multiple fibers may share a common conduit at some segment and hence share the risk of impact. For service reliability, diversity routing can be used whenever possible to minimize service impact due to a single failure such as a fiber/conduit cut. FIG. 1 illustrates an example corresponding to a tower outage case in where a few cell sites routed over the fiber network, and a single fiber outage can cause multiple cellular sites to lose network connectivity. The impact analysis and rehoming of cellular towers disclosed herein can facilitate a resilient backhaul solution where instead of a number of close by cell towers failing, causing widespread failure of service, scattered towers (e.g., FIG. 2) can fail which can enable other nearby towers to provide coverage for the failed tower.

A radio access network can comprise the UEs, the NodeBs (e.g., at the cellular tower) and the Radio Network Controllers (RNCs, at the MTSOs). Cellular towers perform wireless link transmission/reception to/from the UEs via the Uu radio interface, and communicate with the RNC via Iu-B link that is routed on top of the underlying backhaul transport network. Generally, cellular towers have multiple transceivers and are sectorized. Multiple transceivers help the cellular tower to employ different frequencies and antenna to serve different sectors. A cellular tower typically has 3-9 sectors. Such sectorized cellular towers may employ directional antenna to serve different regions around the cellular tower. The antenna at each sector is also characterized by its azimuth angle, tilt, and transmission power. These factors, along with the terrain and landscape features around the cellular tower, determine the coverage range of the sector, which however are extremely difficult to compute accurately in reality (e.g., hard to quantitatively parameterize terrain/building information into coverage model). Each RNC typically manages tens to hundreds of cellular towers and serves as a gateway to the core network.

Once a UE is on the network, the affiliation between the UE and the sectors/towers is managed through maintaining a so-called active Radio Link Set (RLS) at both the UE and the RNC end. The RLS contains the identity of the sectors that a UE is simultaneously listening to and transmitting to. These sectors may belong to different towers, which may be further controlled by different RNCs. When transmitting data from UEs, all sectors in the RLS participate in receiving and decoding the data frames, and when transmitting data toward UEs, a primary sector in the RLS is responsible for sending the data frames. UEs continuously monitor the received signal strength from all "visible" sectors and communicate with RNC periodically so that RNC is able to optimize the channel allocation for all UEs in the proximity. The decision of RLS updates (inclusion of new sectors or removal of existing ones) is signaled back to UEs and coordinated with cellular towers for future data transmission. This signaling and adaptation of RLS provide a natural mechanism in UTRAN to support user mobility and to achieve load-balancing and fault-tolerance to cell/tower outages.

Data can be collected from the network for the service impact prediction analysis. The first data source is the UTRAN counters. In UMTS network, the Element Management System (EMS) for NodeBs and RNCs maintains a wide range of service load and performance measurement counters. Similar to the SNMP MIBs in routers, these UMTS counters track the frequency of network/service events (e.g., the number of successful/unsuccessful Radio Resource Control (RRC) requests), the packets and bytes. owing through each network interface, and other service and device self-monitoring metrics (e.g., queue length and CPU utilization). In an exemplary cellular provider network, there can be over 300 different types of UMTS counters tracked and collected at 15-minute granularity and associated with varying levels (sector/cellular tower/RNC). These raw counter values are further aggregated (e.g., at hourly granularity) and processed according to vendor- or carrier-defined formula into service metrics reflecting (1) the service demand/load such as the number of connection requests, the Erlang, or the data volume, and (2) the service performance quality such as the accessibility (e.g., voice and data call setup success rate and delay), the retainability (e.g., call drop rate), the mobility (e.g., hand-over frequency and delay), and the application performance (e.g., voice call quality and data throughput).

To quantify the service impact of cellular tower outages, some loss-of-service metrics are often considered. One key metric used in network operation to quantify service load is the number of UE in service, which is derived from a counter statistic, "number-of-UEs", capturing the time-average value of the total "number-of-UEs" associated with each sector within the data collection time window. is counter is maintained at RNC that computes summary statistics of the active RLS of all UEs under its control. Particularly, for each sector, RNC periodically (e.g., every second) records the number of UEs affiliated with the sector when the size of the UE's active RLS is k and computes the time-average for each k. To avoid double counting of UEs, the number-of-UEs metric is generated by taking a weighted sum of those summary counters with the weight being 1 k. For example, an UE with 4 sectors in its active RLS would contribute 0.25 to the value of number-of-UEs metric for each sector in its RLS.

The second data source contains massive amount of UE-level measurements regarding UE location and its signal strength information. The location estimates of UEs are obtained by combining GPS locations and inferred locations based on relative timing offset information reported by individual UEs. GPS locations are always preferred if available. However, UEs can report GPS locations if they are exposed to satellites, which can limit the availability of GPS locations to the UEs that are outdoors, in-vehicles or by windows. When GPS locations are unavailable, the locations of UEs can be inferred by measuring the propagation delay between the UE and one or more cellular sites. The timing offset of the pilot signals from different sectors can calibrated using UEs with GPS location information in the region. This calibration process can take place periodically or aperiodically. The calibration-adjusted timing offset information from multiple cellular towers is then used to geolocate the UEs in the region through identifying the intersection points of different hyperbolic curves in reference to the cellular tower geo-coordinates. A system located at each MTSO observes all signaling message exchanges with the RNCs, which contains the Received Signal Strength Indication (RSSI) and Time Difference of Arrival (TDOA) information for the reported sectors visible to the UEs, and geo-locates the UEs. This method generally achieves a location accuracy level in the range of meters.

As GPS location is available to a portion of all UEs and the non-GPS based location requires the UE to exchange the signaling messages with RNC regarding multiple cellular towers, not all UEs are "locatable". The "locatability" of UEs is proportional to their signaling activity levels, which can vary dramatically from grid to grid. On one hand, UEs in grids under coverage of multiple towers are more "locatable" as they are more likely to exchange signaling messages with RNC to achieve hand-over among multiple towers. On the other hand, UEs in grids dominated by a single tower (e.g., at the foot of a tower) are harder to be located by the geo-locating algorithm as they use multiple hyperbolic curves to determine the intersection. Each record in the second data source contains a timestamp, the location estimate (latitude-longitude coordinate) of the UE, and a list of cellular sectors and their corresponding radio signal quality at the UE. The UE identification information can be anonymized in this dataset to protect the privacy of mobile users.

To evaluate the potential impact of a transport circuit outage, one ought to understand and quantify the service impact when a group of its associated cellular towers becomes out-of-service. This is enabled with a comprehensive understanding of the radio signal profile in the area of the impacted towers, the spatial distribution of UEs therein, and their expected service workload.

S can be the set of radio sectors in the provider network. For each sector s∈S, the service load measured on the sector (over time) is a time series $\{y_s;t\}$, where t∈T indicates the time bin from which the measurement data are collected, and T is the set of such time bins. This measurement is derived from the UTRAN counter values in hourly aggregates that are contained in the aforementioned first data source. The number of UEs in service can be used as the service load metric as it is commonly used operationally when loss-of-service is reported. Note that the approach remains applicable when other metrics, such as bytes transferred, are used. This dataset can be referred to as $D_{sector}$ in the rest of this disclosure.

The geographical space is divided within the service area of the provider network into small grids. Based on the average location accuracy of the deployed geo-locating algorithm, which ranges from meters to tens of meters, the grid size can be set to 100-meter by 100-meter. G is denoted as the set of geographic grids. We aggregate the UE geo-location measurement data (e.g., the aforementioned second data source) both in time and in space, and report the observed number of UEs as a time series $\{x_g;t\}$ for each grid g∈G, where t∈T. We will refer to this dataset as $D_{grid}$ in the rest of this disclosure.

Lastly, based on the reported radio signal quality measures in the UE geo-locating measurement data, we can also derive the association mapping of the geographic grids G to the subset of sectors S that can deliver a functional level of radio signal strength to the grid. We assume such radio footprint is relatively stable in the course of days to weeks. The association relationship is defined by a binary matrix C of size |S| by |G|; A matrix element $c_{s,g}=1$ if and if sector s∈S has radio coverage for grid g∈G. We refer to this data as $D_{assoc}$ in the rest of this disclosure.

We define the hypothetic outage scenario as a tuple $O=(S_O, t_O)$ where $S_O \subseteq S$ is the set of out-of-service sectors and $t_O \in T$ is the time bin of this outage. Outages spanning over multiple time bins can be straightforwardly decomposed into multiple sub-outages that each lasts a single time bin. Our objective is to estimate the loss-of-service due to the service outage at $S_O$, which we denote as $H_O$.

If there were no radio coverage redundancies among sectors, Ho can simply be computed as $$H_O = \sum_{s \in S_O} y_{s,t_o} \qquad \text{Equation 1}$$

However, with redundant radio coverages, the actual service impact is smaller than the above, and has to be determined at the grid level. We define as $G_O \subseteq G$ the geographical space that loses service coverage during outage O:

$$G_O \triangleq \{g \in G \mid c_{s,g} = 0 \text{ for } \forall s \in S - S_O\} \qquad \text{Equation 2}$$

We define the service workload, measured by number of UEs, in each grid g at time t as random variables $z_{g,t}$. It follows that $$H_O = \sum_{g \in G_O} z_{g,t_o} \qquad \text{Equation 3}$$

Our objective is to identify an unbiased estimator $\hat{H}_O$ for $H_O$ based on our measurements, which ideally also has a low variance. This is a challenging goal since the grid-level measurements in $D_{grid}$ is "skewed" by the non-uniform locatability of UEs, which is hard to "invert" by itself. The skewness in $D_{grid}$ can be modeled as a sampling process, e.g., if there are 100 UEs in a certain grid but 70 of them are located by our system, then these located UEs are obtained by sampling the 100 UEs with a sampling ratio of 70%. Fortunately, the UTRAN counters based dataset $D_{sector}$ is quite accurate. We can then formulate and construct a ridge regression model, calibrating dataset $D_{grid}$ with $D_{sector}$ and then generating a more accurate estimator with the calibrated data.

The least square problem involves solving for |S|×|G| variables. Since |S| and |G| for the entire country is gigantic ($|S| \approx 10^5$ and $|G| \approx 10^9$), solving this problem would be very time and space consuming. Fortunately, it can be decomposed into |S| small problems as follows, which are much easier and faster to solve. First, since we have $a_{s,g}=0$ if $c_{s,g}=0$, Equation (3) can be simplified as $$E[y_{s,t}] = \sum_{g:c_{s,g}=1} u_{s,g} \cdot E[x_{g,t}] \qquad \text{Equation 4}$$

As the radio coverage of a single sector is limited, number of grids involved in the above equation can be upper bounded by a constant. As a consequence, the minimization problem in can be split into |S| disjoint subproblems as follows.

$$\{\hat{u}_{s,g} | g \in G\} \sum_{t \in T} \left( y_{s,t} - \sum_{g:c_{s,g}=1} \hat{u}_{s,g} \cdot x_{g,t} \right)^2 (s \in S) \qquad \text{Equation 5}$$

Each of these subproblems involves O(1) variables and can be solved separately. Such simplification can also mitigate the overfitting problem since less variables are involved in each of the least square problems.

Accommodating tower capacity constraints. Another way to improve the accuracy of the above estimator is to add tower capacities as constraints when calculating the customer impacts as it's possible that not all UEs from the failed towers can be accommodated by the adjacent towers. To involve the capacity constraints, it is determined how UEs are relocated to alternate towers. But this is generally very hard in practice. A straightforward approach is simply assuming that UEs from the failed towers first try to connect their nearest alternate towers, and continue to try the second nearest if rejected by the first one, so on and so forth. But this may not always be the case in practice according to our test: the closest tower is not necessarily to be the one that delivers the strongest signals to the UEs and thus may not be their first choice when they are trying to reconnect. Accommodating the capacity constraints using such inaccurate approaches may not necessarily benefit the performance of our estimator and may even do the opposite in some cases. Fortunately, in practice, network planners tend to deploy sufficient redundancies in the real cellular networks such that the workloads transferred from the failed towers rarely exceed the capacity limit of the alternate towers (even during some really special events, like Super Bowl, additional temporary cell sites will be deployed to mitigate the workload pressure). There's can be a good match between the customer impact estimated by TOIP (without considering capacity constraints) and the ground truth reported by network operators (in which the capacity constraints are involved), proving that our results are good enough even without involving the capacity constraints.

TOIP can be evaluated using synthetic data. To generate the synthetic data, we consider a 10 km×10 km geographical area with 10 randomly located cellular towers. This area can be divided into 100×100 grids, each representing a 100 m×100 m geographical bin. From the best practice in the real cellular network, the cellular service providers usually deploy more towers in the areas with larger UE densities (e.g., the urban area). And to limit the interference among different towers, the antennas are tuned so that each grid is covered by a small number of towers. Accordingly, to make our simulation closer to the reality, we enforce the following two properties in our simulation model: the E density in each grid is positively correlated with the tower density in its nearby area; and the coverage of a tower is negatively correlated with the number of towers in its nearby area. Specifically, in the simulation, we assume that the antennas are tuned so that each grid is covered by its nearest 4 towers. The actual number of UEs within a grid g at time t, denoted as $z_{g,t}$, is modeled as a Gaussian random variable, each with its mean and standard derivation proportional to the towers density in the nearby area of this grid.

Figure 5:
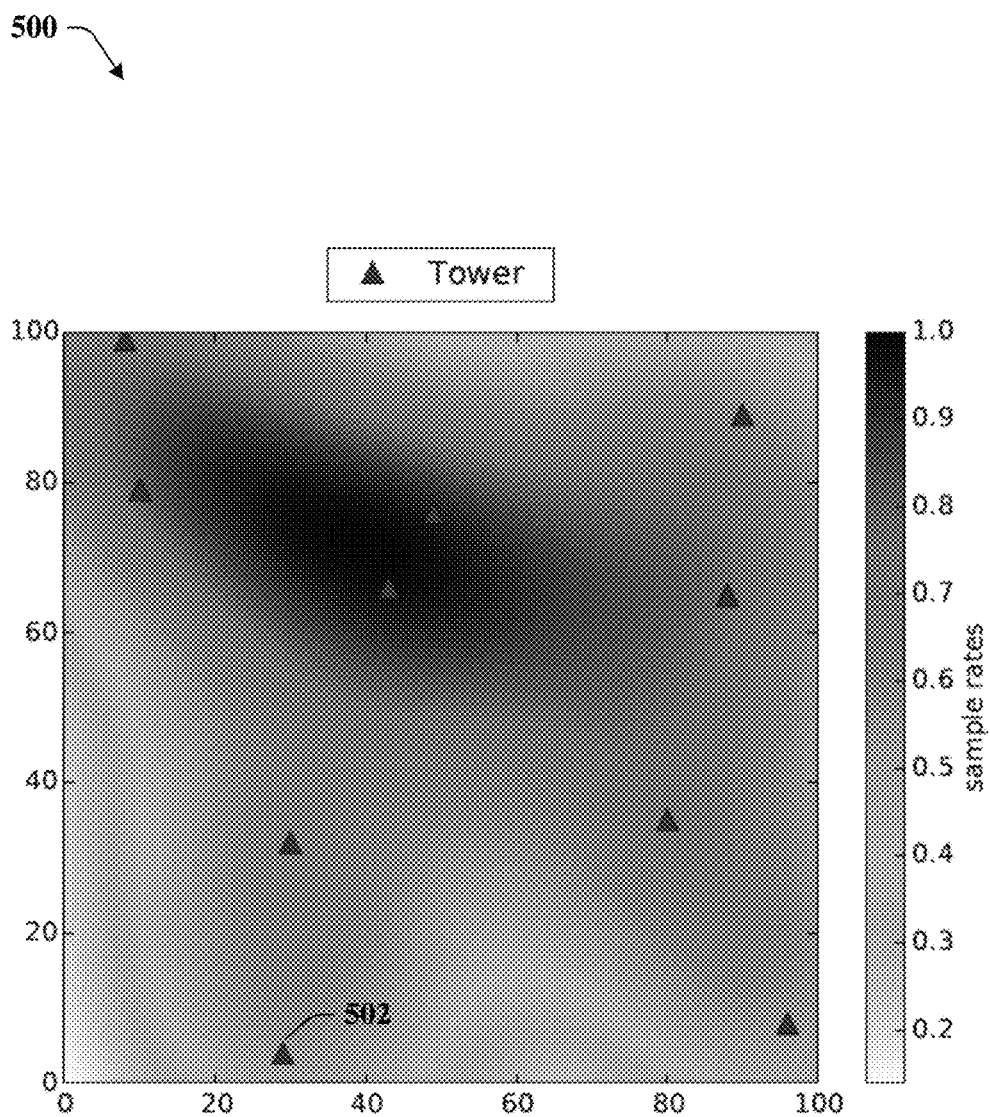
FIG. 5 illustrates an example graph showing a network topology in accordance with various aspects and embodiments of the subject disclosure.

We assume that the radio transmission in this area follows the log-distance path loss model and the probability that a UE connecting to a certain tower (with this UE in its coverage) is proportional to the power strength it receives from the tower. The number of UEs connecting to each tower is then calculated according to the above tower-grid associations. Due to the non-uniform locatability of UEs, the number of UEs in each grid observed by our measurement system can be modeled as a random sampling process. As UEs in grids under coverage of multiple towers are more "locatable" as they are more likely to exchange signaling messages with RNC to achieve hand-over among multiple towers, we assume that the sampling rate (proportion of located UEs) within a certain grid is proportional to the density of towers in its nearby area. FIG. 5. shows an example of the network topology generated in this way where there are a series of base stations (e.g., 502) and a heat map showing coverage by area. Standard kernel density estimator (KDE) with Gaussian kernels is invoked here to estimate the tower densities at different locations. Average sampling rate of grid g, denoted as pg, is then calculated by multiplying the tower densities with a scaling factor such that the maximum sampling rate over the whole area is normalized to 1. Observed number of UEs in grid g at time t, denoted as $x_{g,t}$, is then generated according to the corresponding sampling rate, e.g., $x_{g,t}=\text{Binomial}(z_{g,t},p_g)$.

Our first set of experiments evaluates the accuracy of the per-grid scaling factor estimation made by TOIP. For the randomly generated network topology and load described above, we calculate the estimated scaling factor $\hat{r}_g$ for each grid using our TOIP algorithm trained with number-of-UE time series of length 100,000) and compare it with the ground truth $r_g=1/p$. The empirical cumulative distribution function (CDF) of the ratio $\hat{r}_g/r_g$ is shown in FIG. 5. As shown in the figure, this ratio is concentrated around 1 throughout the grids, demonstrating that the estimated scaling factors $\hat{r}_g$ are indeed unbiased and empirically also have a small variance.

Figure 6:
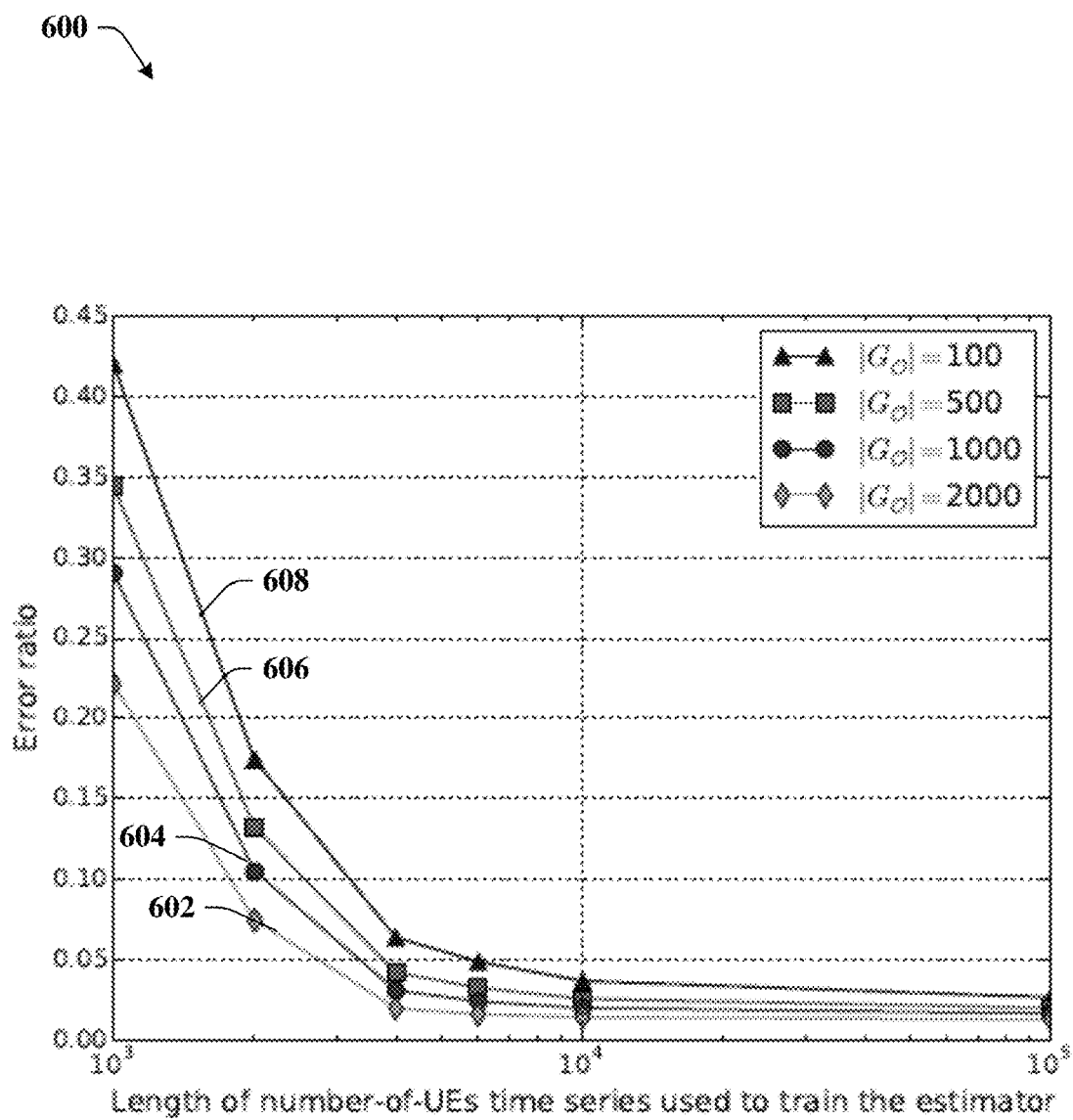
FIG. 6 illustrates an example graph showing an error ratio of service impact estimation made by a tower outage impact predictor in accordance with various aspects and embodiments of the subject disclosure.
Figure 7:
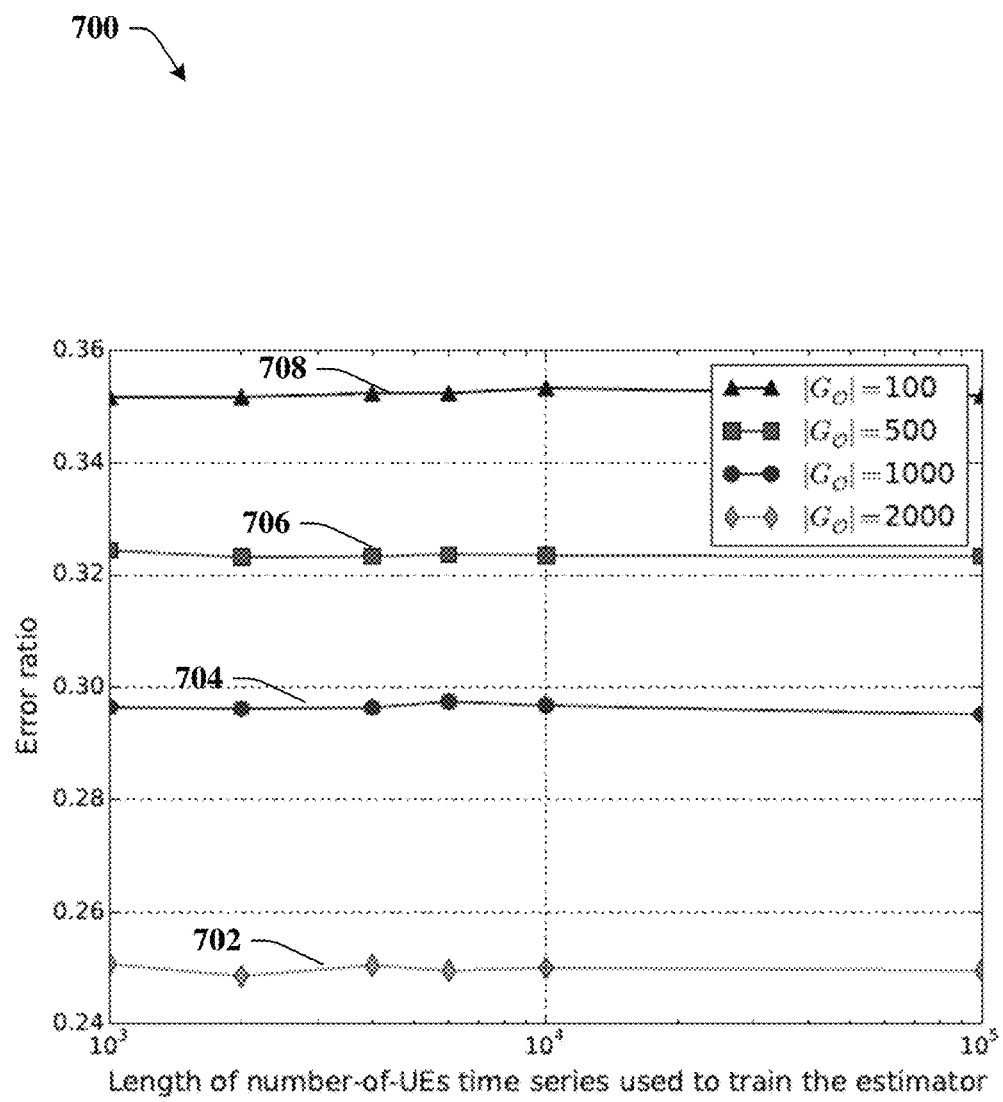
FIG. 7 illustrates an example graph showing an error ratio of service impact estimation made by a strawman algorithm in accordance with various aspects and embodiments of the subject disclosure.

To further evaluate the service impact estimation accuracy for potential tower outages, we randomly select a block of grids as the outage area $|G_o|$ and estimate the total number of UEs in this area using TOIP. We randomly generate 10 different network topologies, repeat this process 10,000 times for each of such topologies and report the overall average estimate error ratio as the result. We use a strawman algorithm here to compare with our TOIP, which simply uses the inverse of the average sampling rate over the whole area to recover the number of UEs instead of the per-grid scaling factors $\hat{r}_g$. We vary the length of the number-of-UEs time series used to train the estimator and the sizes of the outage areas $|G_o|$ in the experiments. The results are shown in FIGS. 6 and 7. We can observe that with a sufficient amount of training data, the estimation error ratio of TOIP is around 3%~5% while the strawman algorithm is around 30%. The estimation accuracy of TOIP is significantly better than the strawman algorithm.

As can be seen in graph 600 FIG. 6, which depicts the error ratio of service impact estimation by TOIP for $|G_o|=100$ (608), $|G_o|=500$ (606), $|G_o|=1000$ (604), and $|G_o|=2000$ (602) as the length of number of UEs times series used to train the estimator go up, the error ratio decreases. Likewise, in graph 700 of FIG. 7 which shows the error ratio of service impact estimation made by a strawman algorithm, for each of $|G_o|=100$ (708), $|G_o|=500$ (706), $|G_o|=1000$ (704), and $|G_o|=2000$ (702), as the length of the number of UEs time series to train the estimator increases, there is very little change in the overall error ratio.

The third set of experiments investigate the robustness of TOIP on missing data. As mentioned above, with the help of dataset $D_{assoc}$, we may first find geographic grids that are physically in the coverage of a given tower/sector, simplifying the least square problem. However, surprisingly, we can still perform this step without reducing the overall accuracy of our estimator too much even if there's missing data in $D_{assoc}$. To evaluate the robustness of our estimator on data incompleteness, we randomly drop 50% of the tower-grid association information in the synthetic data and use the remaining data to train the TOIP estimator. When part of the tower grid association information is missing, TOIP will automatically cast more weights on the remaining tower-grid associations. This may lead to inaccurate estimation of the scaling factors $\hat{r}_g$. More specifically, it may tend to underestimate scaling factors of the grids with more missing data while overestimate the others. However, such distortion could cancel out with each other when we consider a block of grids. As shown in graph 800 of FIG. 8, the estimation error ratio is increase by 3%_5% for each of $|G_o|=100$ (808), $|G_o|=500$ (806), $|G_o|=1000$ (804), and $|G_o|=2000$ (802), even if 50% of the tower-grid association information is missing. In other words, TOIP is quite robust even when the data is incomplete.

In this section, we evaluate the performance of TOIP by comparing with the ground truth from historical real tower outages in a large operational cellular network. We trained TOIP using 45 days of measurement data collected from a large operational cellular network. In order to evaluate the prediction accuracy of TOIP, we collect a set of 43 historical real tower outages that occurred in a 3-month time period. The number of out-of-service towers varies from 1 to about 50 in these outage cases. The ground truth of service impact (in terms of number of UEs that lost cellular service) for these outage cases are generated by network operators using reliable network monitor and analysis tools. The operator-reported service impacts are normalized (as required by the service provider we are working with), which served as the ground truth in our evaluation.

As shown in Table 1, the operation team can classify the service impact (in terms of number of UEs that lost cellular service) of different outages into 6 categories according to their severities. In other words, minor errors in the prediction can be ignored as long as they are not crossing categories. For example, on one hand, if TOIP predicts the service impact as 0.01 while the ground truth is 0.011 as they both are still in the same category. But, on the other hand, we call it an error if the prediction and ground truth are in two different categories.

TABLE 1

| Outage severity categories | |
| --- | --- |
| Outage severity category | Service impact (normalized) |
| Level 1 | 0~0.002 |
| Level 2 | 0.002~0.02 |

TABLE 1-continued

| Outage severity categories | |
| --- | --- |
| Outage severity category | Service impact (normalized) |
| Level 3 | 0.02~0.1 |
| Level 4 | 0.1~0.2 |
| Level 5 | 0.2~0.6 |
| Level 6 | >0.6 |

Figure 9:
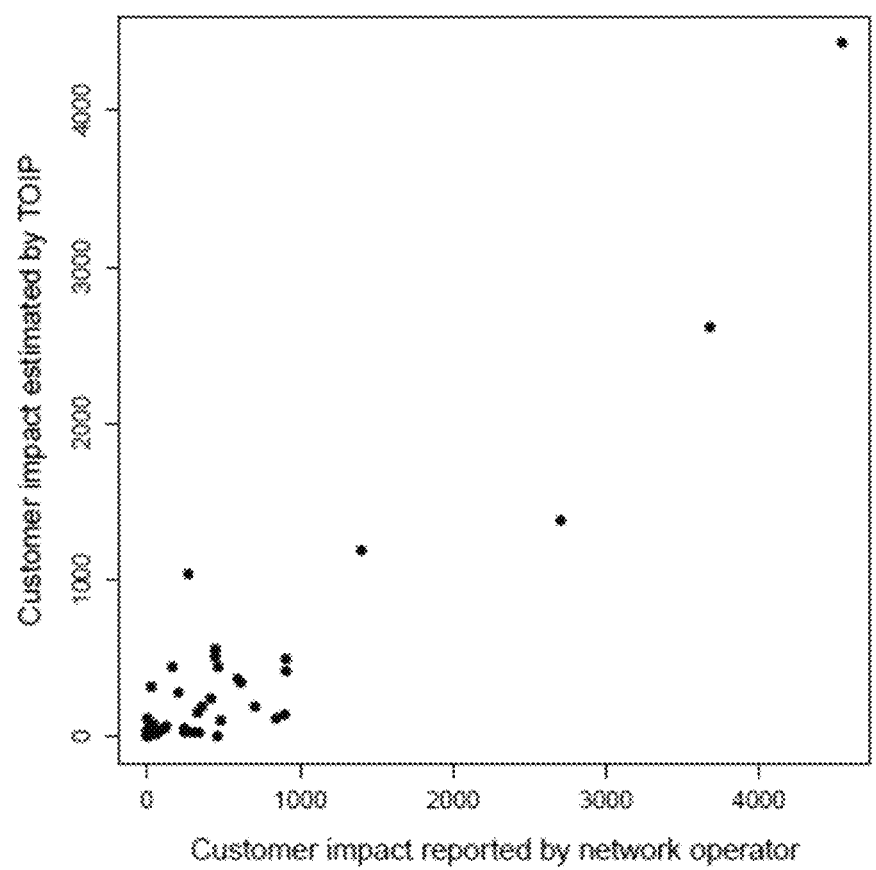
FIG. 9 illustrates an example graph showing a customer impact estimation made by a tower outage impact predictor in accordance with various aspects and embodiments of the subject disclosure.

As shown in FIG. 9 in graph 900 for the above 43 real outages in the network, we compare our "predicted" (in retrospect) number of UEs that lost service with the operator-reported service impact. We find remarkably good matches between our prediction and the ground truth—showing a prediction accuracy of 92.68%, which is high enough for operational use.

As TOIP accurately estimates the cellular service availability given a potential backhaul network failure scenario, it becomes a powerful tool for cellular backhaul network planners to re-optimize their backhaul design, from time to time, so that the impact of any actual backhaul network failure, such as fiber cut or Ethernet card failure, on cellular service is minimized In this section, we demonstrate the efficacy of TOIP in backhaul network re-optimization via simulation studies on a large real-world cellular network topology. More specifically, we show that the use of TOIP can lead to design changes in the backhaul network that would result in significantly improved resiliency to failures Since the cellular backhaul network was designed in phases and cellular towers were built gradually, cellular tower NTEs may not always be optimally homed to backhaul network access devices at all times. Hence cellular backhaul network planners are required to analyze service availability and periodically re-home some of the tower NTEs to backhaul network access devices that provide better cellular accesses to them.

As mentioned above, each tower backhaul connection from its NTE to MTSO consists of two segments: one segment is from NTE to a backhaul network access device and the other is from an access device to a MTSO. The backhaul network is usually a mesh topology with full failure restoration capability whereas the first segment from an NTE to its backhaul network access device is usually single homed over access fibers. At the early stage of backhaul network deployment, when the number of access devices is relatively small, a tower NTE may have to be initially homed to an access site that is relatively far away, resulting in a relatively long unprotected backhaul connection segment. Later on, however, with the expansion of the backhaul network, this tower NTE could become much closer to another access site. In this case, rehoming this tower NTE from the original (faraway) access site to the new (nearby) access site can shorten the unprotected backhaul connection segment and improve tower reliability. There is however another factor to consider in this rehoming: As deployments of access fibers and cellular towers are always limited, multiple tower NTE backhaul connections often have to share a common fiber segment. If this shared common fiber segment is cut, towers with backhaul connections routed over it would fail together, which could impact a large number of customers. Hence, a rehoming operation can take into consideration the service impact of potential backhaul segment failures.

Traditionally, due to budget constraints, a portion of tower NTEs can be re-homed during a certain time period and network planners can prioritize the rehoming operations for different towers. Before TOIP, the state-of-the-art solution for rehoming tower NTEs uses the number of affected cellular towers as the measure to assess the service impact of a backhaul network failure. Under this measure, the service impact of a backhaul failure was simply defined by those towers routed through the failed network segment. Hence, given the high cost associated with any reliability enhancement to backhaul network topology, the planners typically focus on identifying backhaul network segments that are shared by a large number of cellular towers; to mitigate the potential impact of a backhaul failure, they either design additional protection (e.g., adding a secondary circuit) to these network segments or re-home some of the connected cellular towers for them to gain network access via alternative paths.

TOIP, the solution provided by this disclosure, takes a fundamentally different approach to analyzing service availability and offers a more optimized solution to rehoming cellular tower NTEs. In the following, we provide a vis-a-vis comparison between our TOIP-based solution and the prior solution, which we refer to as network impact solution since it considers the network-tower relationship.

TOIP-Based Customer Impact Solution:
1. Find the network segment failure with the largest customer impact (estimated by TOIP). 2. Among all the towers affected by this network segment failure, find the one that, if it's rehomed, will lead to the largest reduction in the customer impact (estimated using TOIP). 3. Rehome this tower. 4. Repeat Steps (1)-(3).

Figure 10:
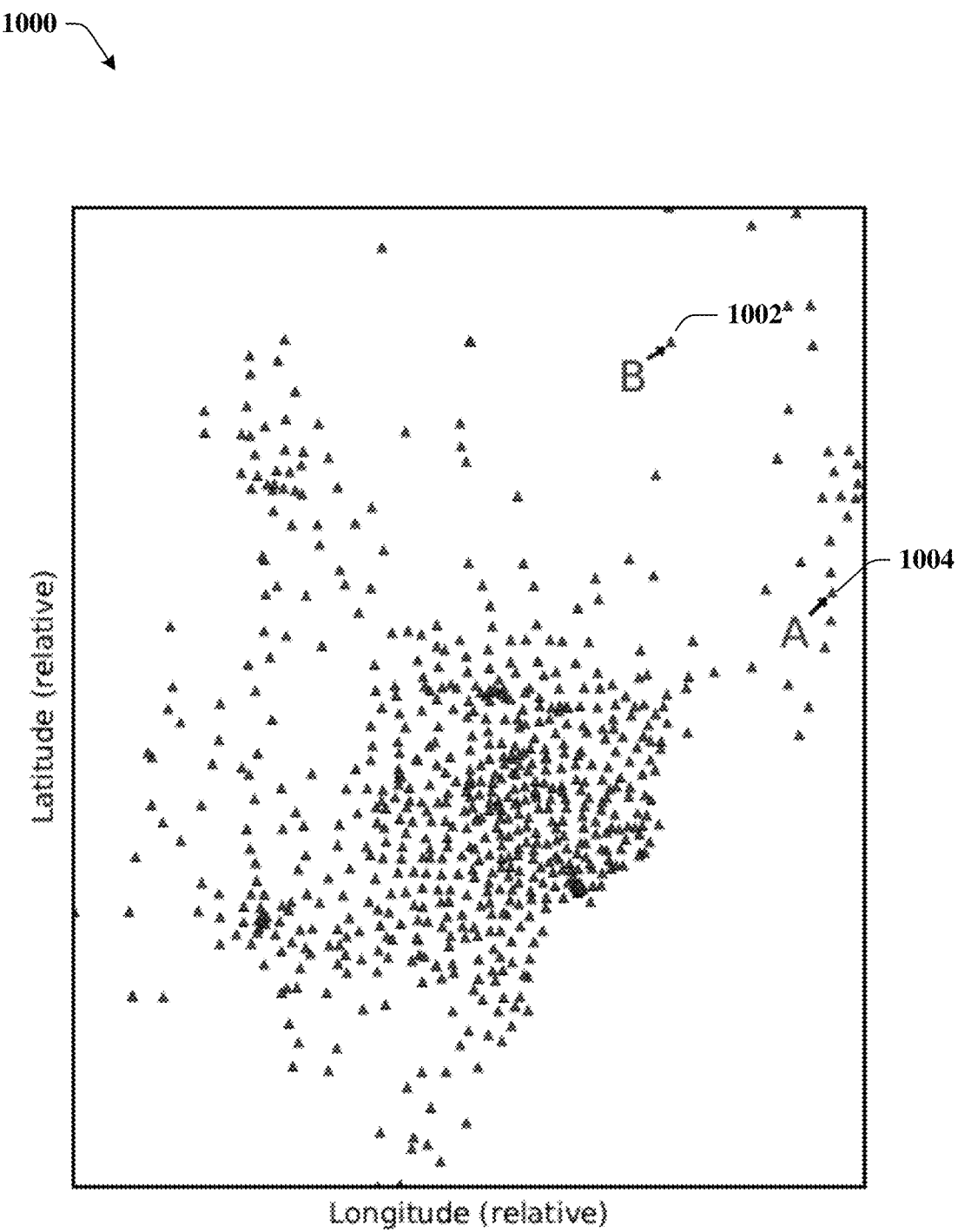
FIG. 10 illustrates an example graph showing a network topology with a rehomed tower in accordance with various aspects and embodiments of the subject disclosure.

To demonstrate the efficacy of using TOIP in improving the resilience of the network, we compare the performance of these two tower rehoming approaches by simulation experiments using a real network topology. The network area we investigated is illustrated in FIG. 10, which is a medium size local access and transport area (LATA) in a large operational cellular network. There are a total of 693 towers and 844 potential network segment failures. This is a coastal metropolitan area. Towers are dense in the city and is sparser in the surrounding suburban and rural areas. This area is divided into about $2\times10^4$ grids, each representing a 1 km×1 km geographical bin (water area is excluded in our simulation). The number of UEs in each grid and the proportion of locatable UEs within the grid are generated using the synthetic model described above.

We use synthetic UE distribution data here because the actual number of UEs in each grid is generally unavailable in practice due to the aforementioned non-uniform locatability of UEs. Such data is however indispensable in calculating the real customer impact (not the one estimated by TOIP) of each hypothetical network segment failure, and its real customer impact can be determined after the tower-rehoming in order to compare the efficacies of these two approaches in improving the resiliency of the network. It is also inappropriate to evaluate the efficacy of the TOIP-based approach using the customer impact estimated by TOIP itself. Hence, as a compromise solution, we use the synthetic UE distribution data here to fill this gap. We emphasize this compromise solution is innocuous for the following reason. As described above, our statistical model of generating such synthetic UE distribution data is inferred directly from the given network topology, and clearly is independent of the statistical models used by TOIP. Hence, intuitively the use of such synthetic data may neither help nor hurt the outcome statistically of the comparison between our TOIP based approach and the prior approach. In graph 1000 of FIG. 10, Tower A 1004 is the first tower rehomed when using the network impact analysis as performed traditionally, but based on the recommendations provided by TOIP, the Tower B 1002 would be the first tower rehomed In our simulation experiments, we rehome a given number of the towers using the above two tower-rehoming approaches respectively, and calculate the "real" customer impacts (using the aforementioned synthetic data) of a potential network segment failure after the rehoming. We vary the number of towers to be rehomed, and report the average and the maximum customer impacts over all potential single network segment failures after rehoming the corresponding number of towers.

Figure 11:
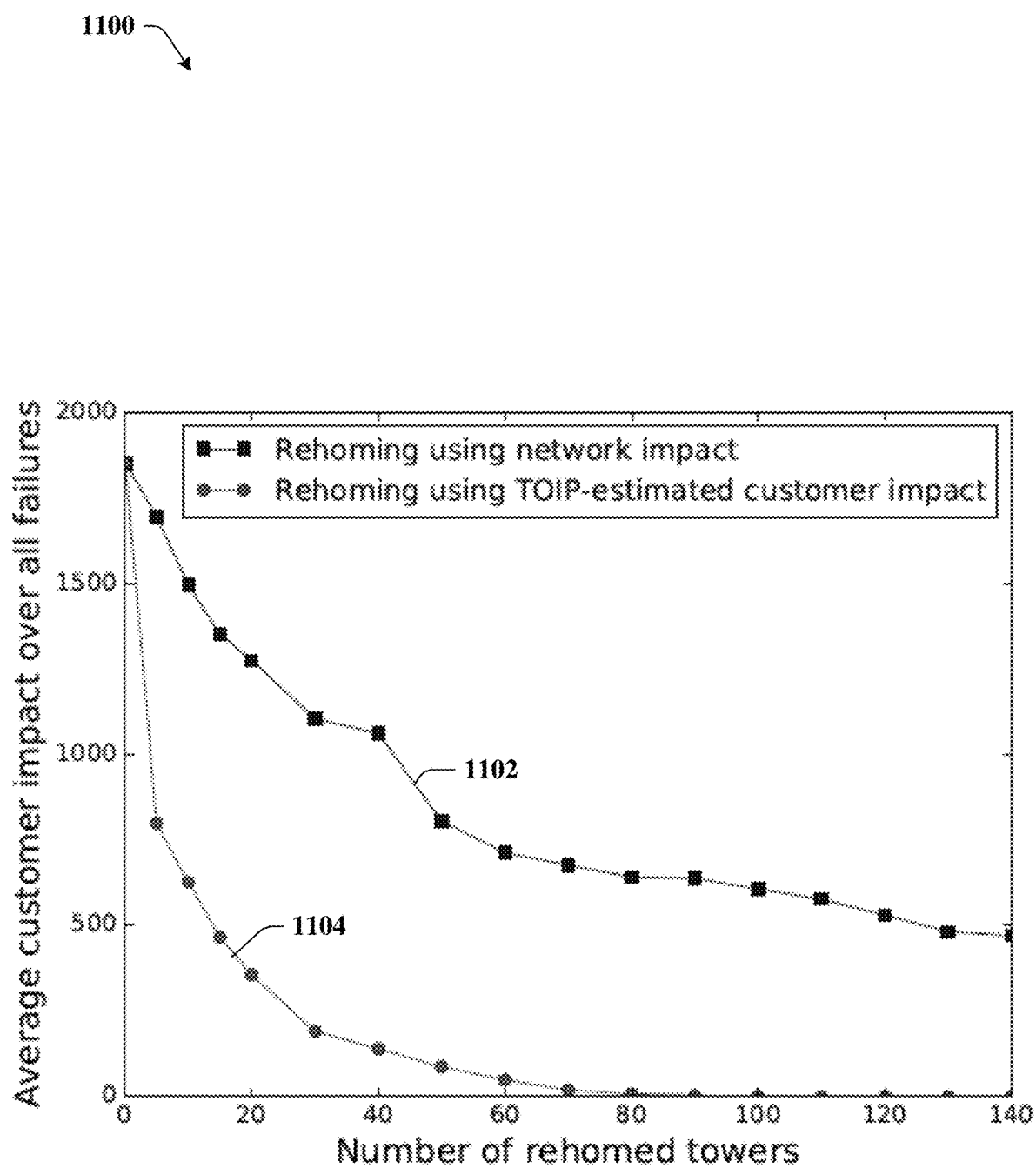
FIG. 11 illustrates an example graph showing a number of rehomed towers using a tower outage impact predictor in accordance with various aspects and embodiments of the subject disclosure.
Figure 12:
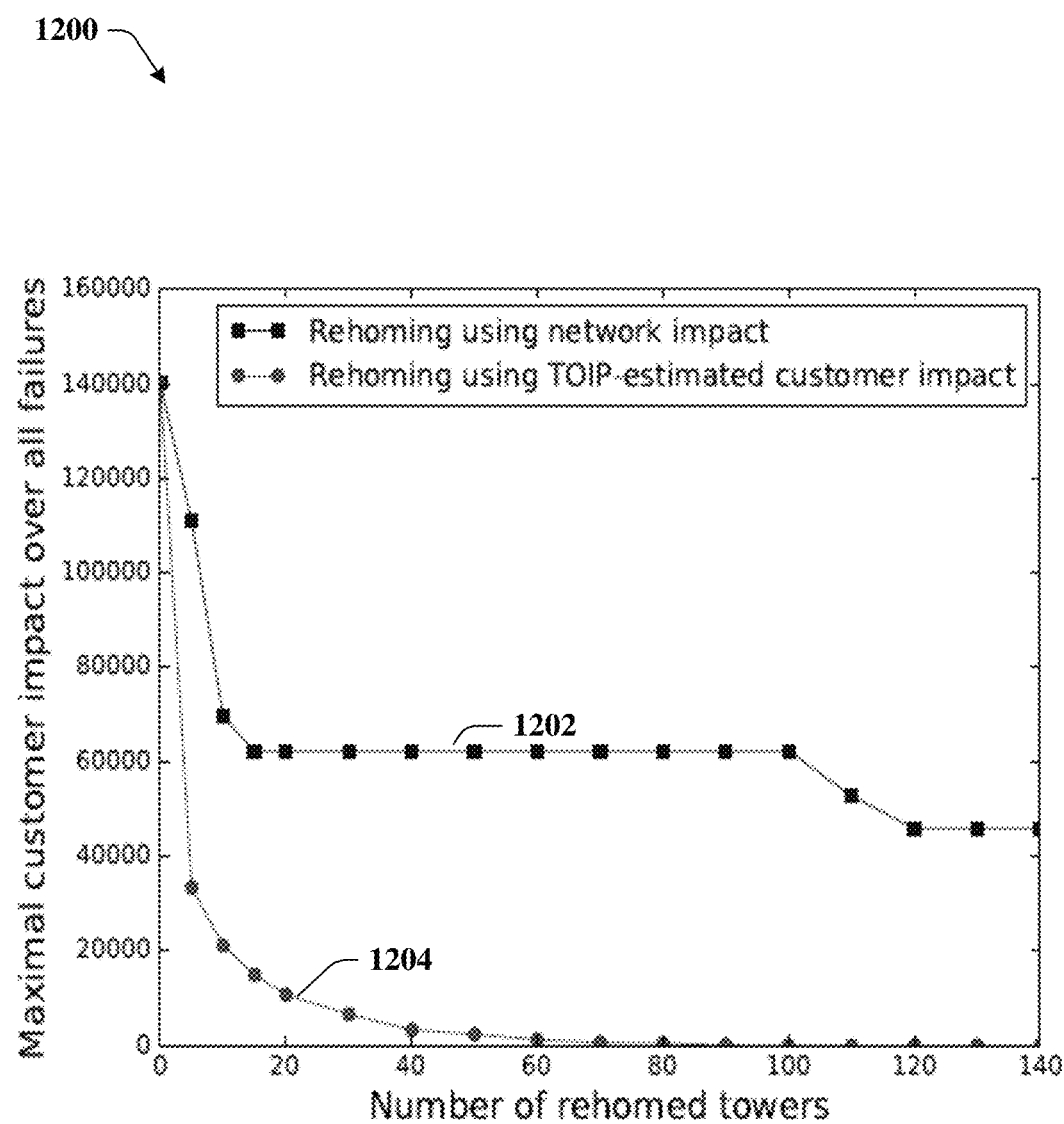
FIG. 12 illustrates an example graph showing a number of rehomed towers using a tower outage impact predictor in accordance with various aspects and embodiments of the subject disclosure.

The results, plotted in FIGS. 11 and 12, show conclusively that our TOIP approach significantly outperforms the prior approach. More specifically, both the average (FIG. 11) and the maximum (FIG. 12) customer impacts of the potential single network segment failures for the TOIP approach drop much faster than those for the prior approach. In FIG. 11, graph 1100 shows that the average customer impact over all failures is lower for the rehoming using TOIP estimated customer impact (1104) than it is for the network impact rehoming (1102) over a broad range of numbers of rehomed towers. Similarly, in FIG. 12, graph 1200 shows that the maximum customer impact over all failures is lower for the rehoming using TOIP estimated customer impact (1204) than it is for the network impact rehoming (1202) over a broad range of numbers of rehomed towers.

Furthermore, perhaps a bit surprisingly, the TOIP tower-rehoming approach is able to reduce the customer impact of each single network segment failure to a negligible value after rehoming about 10% of the 693 towers in both FIGS. 11 and 12. This implies that the affected towers of each single failure are sufficiently "scattered" in the network after rehoming, and will not have a significant user impact when they are brought down.

Figure 13:
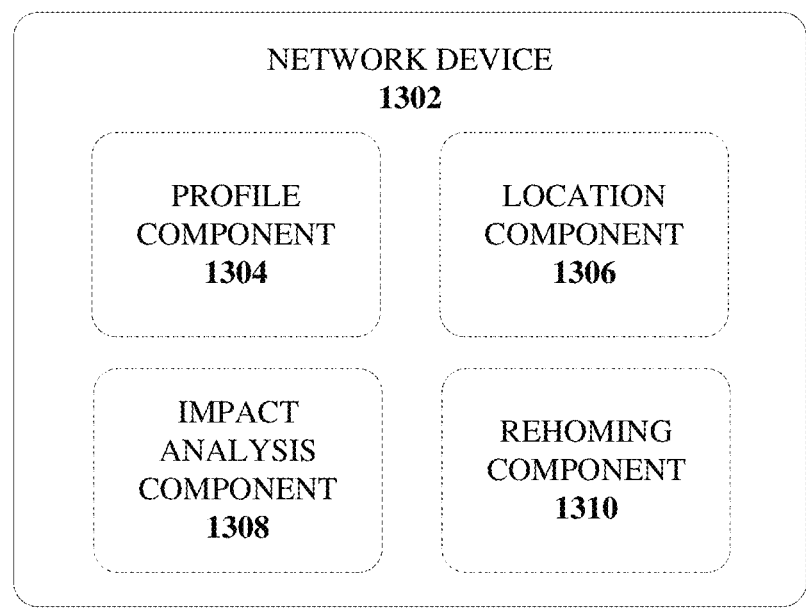
FIG. 13 illustrates an example block diagram of a mobile network device configured to perform impact analysis and design resilient backhaul networks in accordance with various aspects and embodiments of the subject disclosure.

Turning now to FIG. 13, illustrated is an example block diagram 1300 of a network device 1302 configured to perform impact analysis and design resilient backhaul networks in accordance with various aspects and embodiments of the subject disclosure.

The network device 1302 can include a profile component 1304 that can determine a group of radio signal profiles for respective grid sections of a group of grid sections comprising a cellular service area for a cellular network, wherein a radio signal profile of the group of radio signal profiles comprises information relating to a base station device that provides coverage in a grid section of the respective grid sections. The profile component 1304 can determine the radio signal profile based on a measurement report received from a mobile device in the respective grid section, and wherein the measurement report comprises a signal strength of the base station device and wherein the radio signal profile is further based on location information received from the mobile device in the respective grid section A location component 1306 can determine a first number of mobile devices that are active in the respective grid sections of the group of grid sections. The location component 1306 can determine the first number of mobile devices based on a radio link set of a mobile device of the first number of mobile devices, wherein a radio link set is a group of base station devices with which the mobile device is in communication over a defined period of time. The location component 1306 can also take a weighted sum of radio link set counters with a weight being an inverse of a third number of the group of base station devices.

An impact analysis component 1308 can predict a second number of mobile devices that lose coverage as a consequence of a simulated base station device outage, wherein the second number of mobile devices that lose coverage is based on the first number of mobile devices and the group of radio signal profiles for the respective grid sections. The impact analysis component 1308 can predict the numbers based on a ridge regression model. The impact analysis component 1308 can also predict the second number of mobile devices that lose coverage based on load information for a third base station device adjacent to a second base station device that had a simulated outage.

A rehoming component 1310 can determine a rerouting path for a network switch device associated with a second base station device of the simulated base station device outage. The rehoming component 1310 can suggest or determine the rerouting path, or rehoming path based on selecting a smallest number of mobile devices that would lose coverage in the simulated base station device outage.

Figure 8:
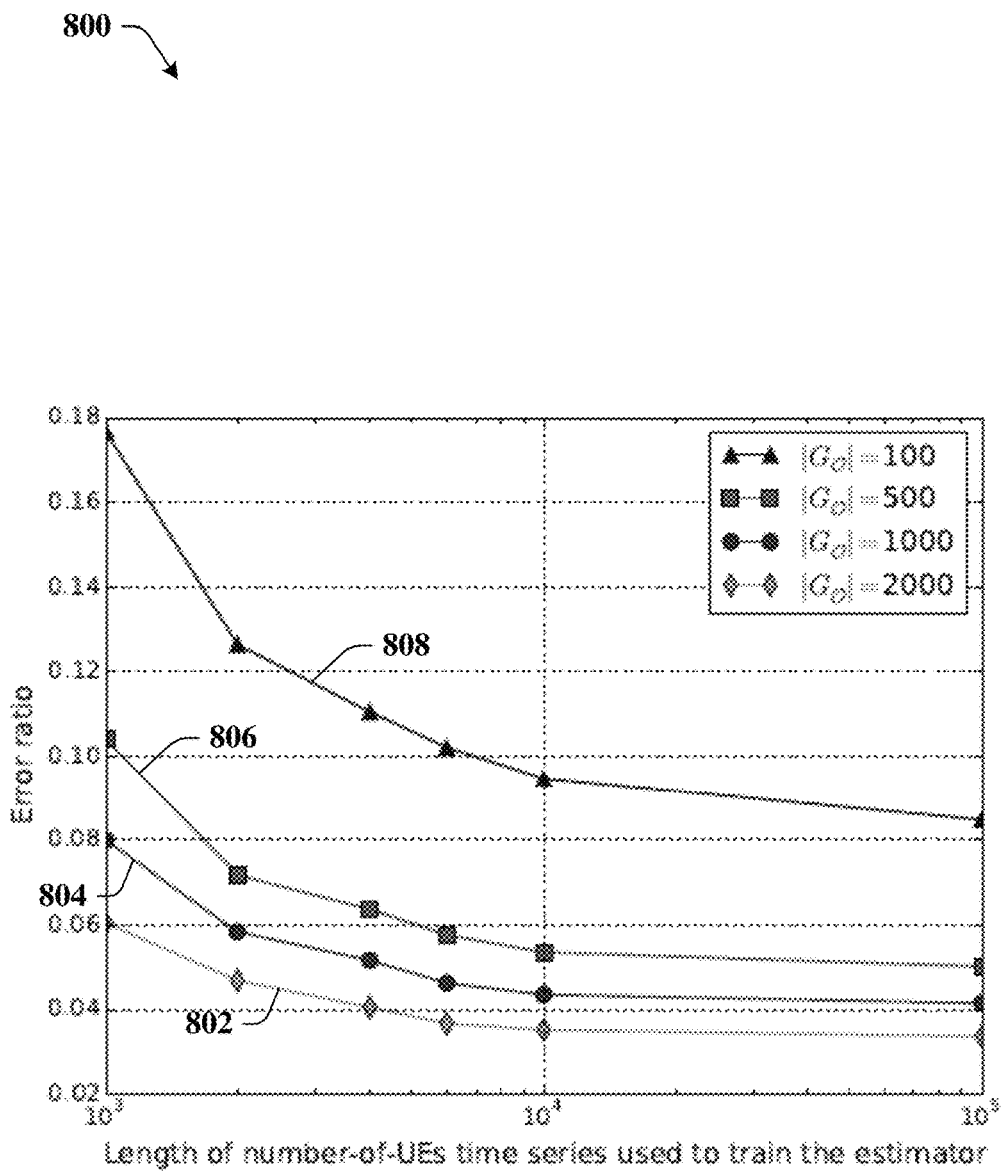
FIG. 8 illustrates an example graph showing an error ratio of service impact estimation made by a tower outage impact predictor using incomplete data in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 14:
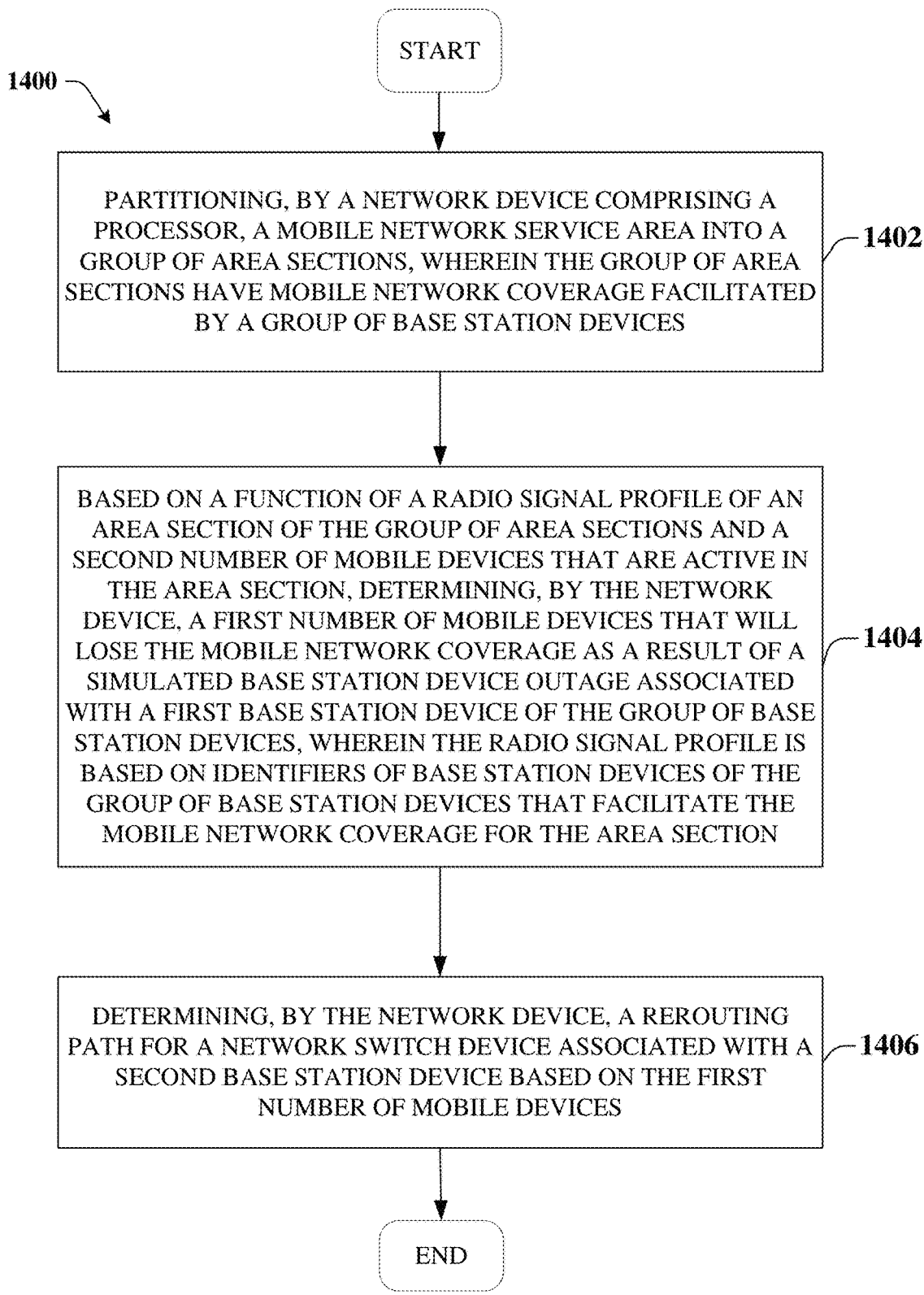
FIG. 14 illustrates an example method for designing a resilient backhaul network in accordance with various aspects and embodiments of the subject disclosure.

FIG. 14 illustrates an example method 1400 for designing a resilient backhaul network in accordance with various aspects and embodiments of the subject disclosure.

Method 1400 can begin at 1402 where the method includes partitioning, by a network device comprising a processor, a mobile network service area into a group of area sections, wherein the group of area sections have mobile network coverage facilitated by a group of base station devices.

At 1404, the method includes. based on a function of a radio signal profile of an area section of the group of area sections and a second number of mobile devices that are active in the area section, determining, by the network device, a first number of mobile devices that will lose the mobile network coverage as a result of a simulated base station device outage associated with a first base station device of the group of base station devices, wherein the radio signal profile is based on identifiers of base station devices of the group of base station devices that facilitate the mobile network coverage for the area section.

At 1406, the method includes determining, by the network device, a rerouting path for a network switch device associated with a second base station device based on the first number of mobile devices.

Figure 15:
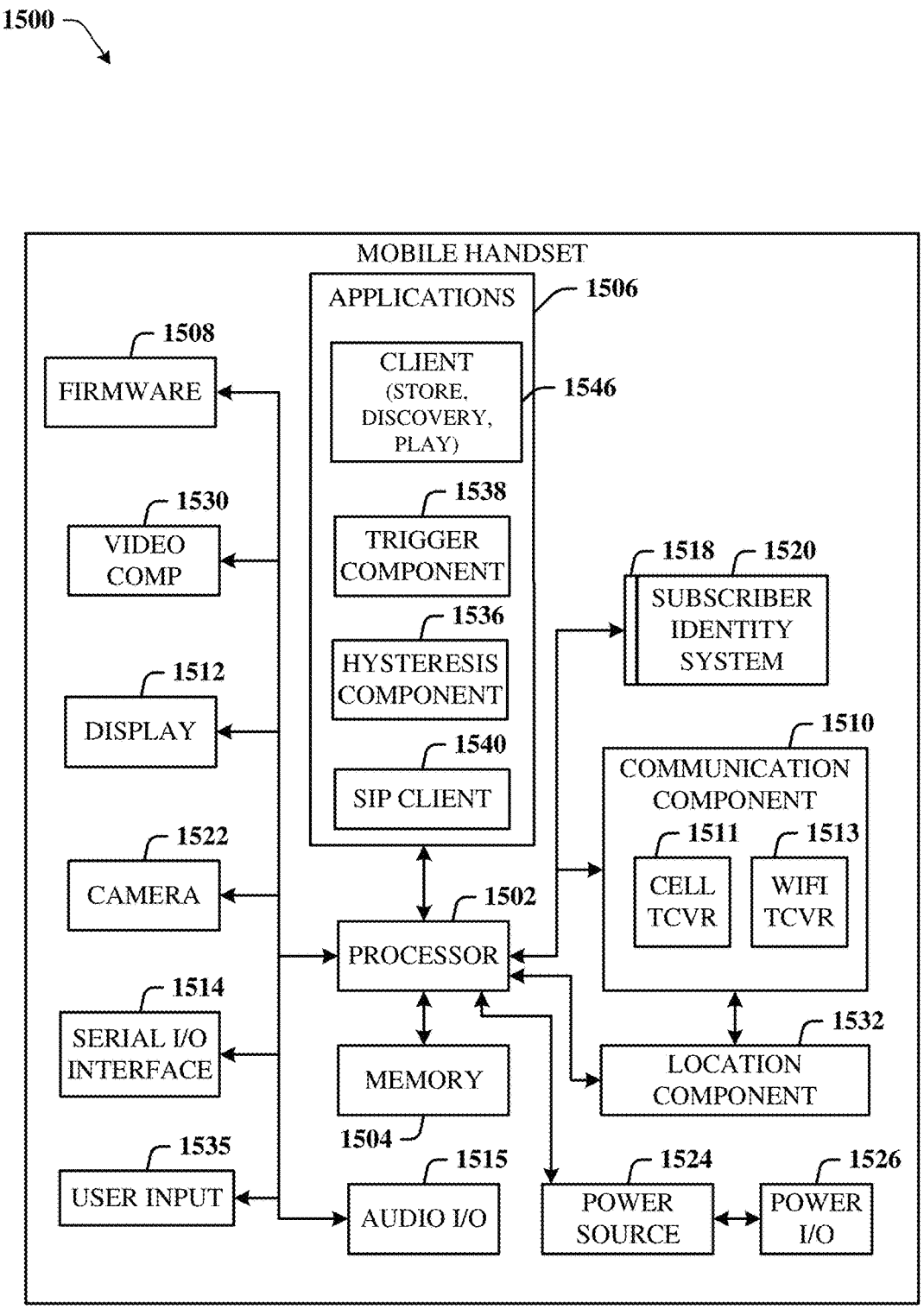
FIG. 15 illustrates an example block diagram of an example user equipment that can be a mobile handset operable to provide a format indicator in accordance with various aspects and embodiments of the subject disclosure.

Referring now to FIG. 15, illustrated is a schematic block diagram of an example end-user device such as a user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500 can include an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
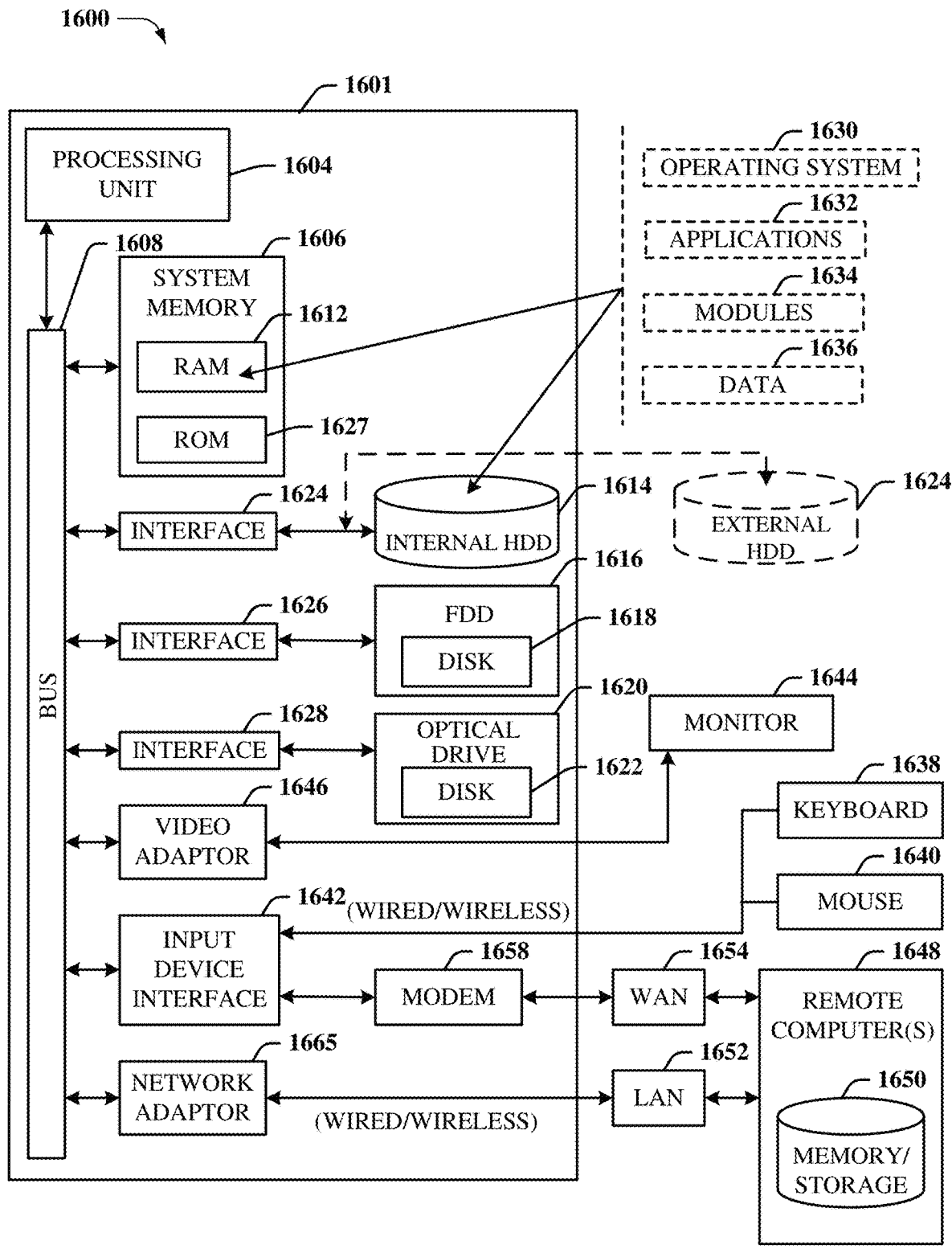
FIG. 16 illustrates an example block diagram of a computer that can be operable to execute processes and methods in accordance with various aspects and embodiments of the subject disclosure.

Referring now to FIG. 16, there is illustrated a block diagram of a computer 1600 operable to execute the functions and operations performed in the described example embodiments. For example, a network node (e.g., network node 1302, e.g.,) may contain components as described in FIG. 16. The computer 1600 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 16, implementing various aspects described herein with regards to the end-user device can include a computer 1600, the computer 1600 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1627 and random access memory (RAM) 1612. A basic input/output system (BIOS) is stored in a non-volatile memory 1627 such as ROM, EPROM, EEPROM, which BIOS contains the basic routines that help to transfer information between elements within the computer 1600, such as during start-up. The RAM 1612 can also include a high-speed RAM such as static RAM for caching data.

The computer 1600 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1600, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the various embodiments can be implemented with various commercially available operating systems or combinations of operating systems.

A user can enter commands and information into the computer 1600 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 through an interface, such as a video adapter 1646. In addition to the monitor 1644, a computer 1600 typically includes other peripheral output devices (not shown), such as speakers, printers, etc.

The computer 1600 can operate in a networked environment using logical connections by wired and/or wireless communications to one or more remote computers, such as a remote computer(s) 1648. The remote computer(s) 1648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1600 is connected to the local network 1652 through a wired and/or wireless communication network interface or adapter 1656. The adapter 1656 may facilitate wired or wireless communication to the LAN 1652, which may also include a wireless access point disposed thereon for communicating with the wireless adapter 1656.

When used in a WAN networking environment, the computer 1600 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 through the input device interface 1642. In a networked environment, program modules depicted relative to the computer, or portions thereof, can be stored in the remote memory/storage device 1650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor, facilitate performance of operations, comprising:
dividing a geographic service area for a cellular network into a grid comprising grid sections, wherein the cellular network comprises base stations that provide coverage of the cellular network, and wherein at least one grid section of the grid sections comprises more than one base station of the base stations;
determining respective radio signal profiles for the grid sections of the grid, wherein a radio signal profile of the respective radio signal profiles comprises information relating to a subset of the base stations that provide the coverage of the cellular network in a grid section of the grid sections;
determining respective first numbers of user equipment that are active in the respective grid sections; and
based on the respective first numbers of user equipment and the respective radio signal profiles for the grid sections, predicting a second number of user equipment that lose the coverage of the cellular network as a consequence of a simulated base station outage of a first base station of the base stations.

2. The system of claim 1, wherein the operations further comprise:
based on the second number of user equipment, determining a rerouting path for a network switch device associated with a second base station of the base stations.

3. The system of claim 2, wherein the determining of the rerouting path comprises selecting the rerouting path that results in a smallest number of user equipment that would lose the coverage of the cellular network as the consequence of the simulated base station device outage.

4. The system of claim 1, wherein the determining of the respective first numbers of user equipment comprises determining a first number of user equipment of the respective first numbers of user equipment, wherein the determining of the first number of user equipment comprises determining the first number of user equipment based on a radio link set of a mobile device of the first number of user equipment, and wherein a radio link set is a group of the base stations with which the user equipment is in communication over a defined period of time.

5. The system of claim 4, wherein the determining of the first number of user equipment comprises determining a weighted sum of radio link set counters, and wherein a weight applicable to the weighted sum is an inverse of a third number of the group of the base stations.

6. The system of claim 4, wherein the predicting of the second number of user equipment is further based on model data representative of a ridge regression model.

7. The system of claim 1, wherein the radio signal profile is based on a measurement report received from a user equipment in the grid section, and wherein the measurement report comprises signal strengths of the subset of the base stations.

8. The system of claim 7, wherein the radio signal profile is further based on location information received from the user equipment in the grid section.

9. The system of claim 1, wherein the operations further comprise:
predicting a third number of user equipment that lose the coverage of the cellular network as consequences of simulated base station outages, the simulated base station outages comprising the simulated base station outage.

10. The system of claim 1, wherein the simulated base station outage is a first simulated base station outage, and wherein the predicting of the second number of user equipment that lose the coverage is further based on load information for a third base station adjacent to a second base station that had a second simulated base station outage.

11. A method, comprising:
partitioning, by network equipment comprising a processor, a geographic service area associated with a mobile network into a grid group of area sections, wherein the mobile network enables mobile network coverage facilitated by base stations, and at least one area section comprises a group of the base stations;
based on a function of respective radio signal profiles of the area sections and respective second numbers of mobile devices that are active in the area sections, determining, by the network equipment, a first number of mobile devices that will lose the mobile network coverage as a result of a simulated base station device outage associated with a first base station of the base stations, wherein a radio signal profile of the respective radio signal profiles is based on identifiers of a subset of the base stations that facilitate the mobile network coverage for the area sections; and
determining, by the network equipment, a rerouting path for a network switch associated with a second base station based on the first number of mobile devices.

12. The method of claim 11, further comprising:
ranking, by the network equipment, the area sections based on respective third numbers of mobile devices that lose the mobile network coverage in the area sections in the simulated base station outage.

13. The method of claim 12, further comprising:
prioritizing, by the network equipment, rehoming backhaul connections for a group of network switch devices associated with respective area sections of the area sections based on the ranking.

14. The method of claim 11, wherein the function comprises a ridge regression function.

15. The method of claim 11, further comprising:
determining, by the network equipment, the radio signal profile based on a measurement report received from a mobile device in an area section of the area sections, the measurement report comprising signal strengths of the subset of the base stations.

16. The method of claim 11, wherein the identifiers are first identifiers, and the method further comprising:
based on location information from the mobile devices, determining, by the network equipment, the respective second numbers of mobile devices that are active in the area sections based on radio link sets for mobile devices in the area sections, wherein a radio link set of the radio link sets comprises second identifiers of another subset of the base stations with which the mobile devices are in communication over a defined period of time.

17. The method of claim 11, further comprising:
predicting, by the network equipment, a third number of mobile devices that lose the mobile network coverage as a result of multiple simulated base station device outages.

18. A non-transitory machine-readable medium, comprising executable instructions that, when executed by a processor of a device, facilitate performance of operations, comprising:
segmenting a geographic service area for a network into a grid comprising grid sections, wherein the network comprises base stations that provide network coverage, and at least one grid section comprises at least two of the base stations;
determining respective radio signal profiles for the grid sections, wherein a radio signal profile of the respective radio signal profiles comprises information relating to a group of the base stations that provides the network coverage in the grid sections;
determining respective first numbers of user equipment that are active in the grid sections;
predicting a second number of user equipment that lose the network coverage in a simulated base station device outage based on the respective first numbers of user equipment and the respective radio signal profiles for the grid sections; and
based on the second number of user equipment that lose the network coverage in the simulated base station device outage, determining a rerouting path for a network switch associated with a base station of the base stations.

19. The non-transitory machine-readable medium of claim 18, wherein the operations further comprise:
determining the radio signal profile based on a measurement report received from a user equipment in a grid section of the grid sections, the measurement report comprising signal strengths of the group of the base stations.

20. The non-transitory machine-readable medium of claim 18, wherein the determining of the respective first numbers of user equipment comprises determining a first number of user equipment of the respective first numbers of user equipment, wherein the determining of the first number of user equipment comprises determining the first number of user equipment based on a radio link set for a user equipment in a grid section of the grid sections, and further based on location information from the user equipment, and wherein the radio link set comprises a list of another subset of the base stations with which the user equipment is in communication over a defined period of time.

* * * * *